W. E. SHEEHY.
SELF LUBRICATING BUSHING.
APPLICATION FILED OCT. 31, 1916.
1,218,808.
Patented Mar. 13, 1917.
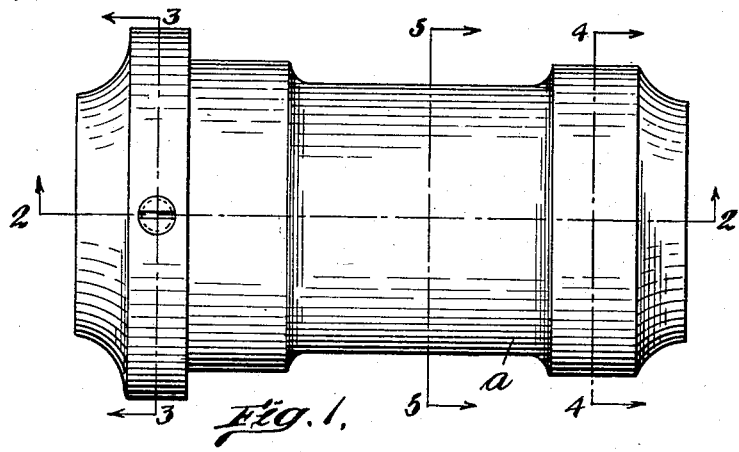
Fig. 1.
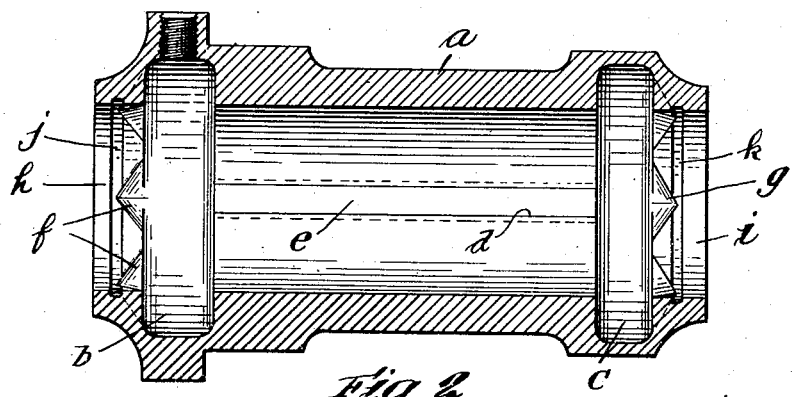
Fig. 2.
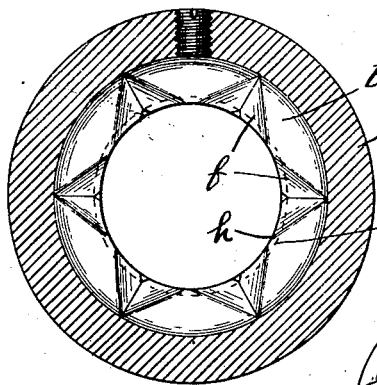
Fig. 3.
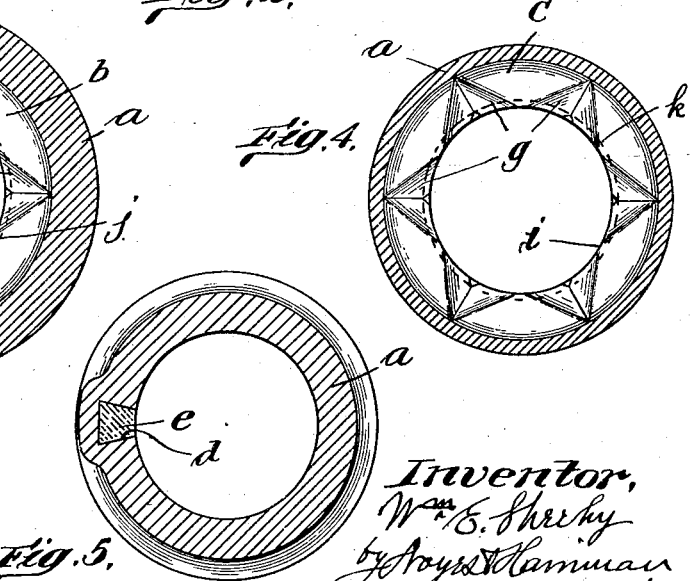
Fig. 4.
Fig. 5.
Witness,
H. B. Davis.
Inventor,
Wm E. Sheehy
by Troy & Hamman
Atty's

UNITED STATES PATENT OFFICE.

WILLIAM E. SHEEHY, OF NEWFIELDS, NEW HAMPSHIRE, ASSIGNOR OF ONE-HALF TO THOMAS SHEEHY, OF NEWFIELDS, NEW HAMPSHIRE.

SELF-LUBRICATING BUSHING.

1,218,808.  Specification of Letters Patent.  Patented Mar. 13, 1917.

Application filed October 31, 1916. Serial No. 128,780.

*To all whom it may concern:*

Be it known that I, WILLIAM E. SHEEHY, a citizen of the United States, residing at Newfields, in the county of Rockingham and State of New Hampshire, have invented an Improvement in Self-Lubricating Bushings, of which the following is a specification.

This invention relates to that class of self-oiling bushings or hubs, in which oil-chambers are arranged in communication with the bearing surface, so that the bushing may run a long time without attention.

The primary object of my invention is to provide a self-lubricating bushing, of simple form, in which means are provided for automatically forcing the lubricant away from its ends, so that the escape of oil will be practically prevented, and the middle portion of the bushing will be thoroughly lubricated.

I accomplish these objects by the means shown in the accompanying drawing, in which:—

Figure 1 is a side elevation of a bushing embodying my invention.

Fig. 2 is a longitudinal central section thereof, on the line 2—2 of Fig. 1.

Figs. 3, 4, and 5 are transverse sections on the lines 3—3, 4—4, and 5—5, respectively, of Fig. 1.

In the drawing, the bushing or hub $a$, illustrated, is similar, in general outline and construction, to prior devices of this character, and, while the device is herein referred to as a "bushing," it will be obvious that the invention may be equally applicable to any device which runs freely on a shaft.

According to my invention, I provide annular recesses, or oil-chambers $b$, $c$, adjacent the ends of the bushing, and opening directly to the bore thereof, said chambers being connected at their inner sides by a longitudinal dovetail slot $d$, having a wicking $e$ therein, the surface of which is flush with the surface of the bore.

The sides of each of said chambers $b$, $c$, lie in planes perpendicular to the axis of the hub, and an approximately regular series of V-shaped notches $f$, $g$ are formed in the outer side wall of each chamber $b$, $c$, so that the sides of said notches extend divergently from the bottoms thereof, which latter extend obliquely from the bottom of the adjacent chamber to the bearing surfaces $h$, $i$, between the end of the bushing and such chamber. An annular groove $j$, $k$ is formed in each surface $h$, $i$, approximately at the middle thereof, and said notches $f$, $g$, are so arranged that the bottom portions thereof open into said grooves $j$, $k$, respectively, at the inner sides thereof.

A series of faces are thus formed by the V-shaped notches, or recesses $f$, $g$, which extend divergently or obliquely outward from the end-bearing-surfaces $h$, $i$, and are also obliquely disposed to the path in which they rotate.

With the above-described construction, when the bushing is rotated at high speed, the oil in the oil-chambers is thrown to the bottom of said chambers by centrifugal action, and is held at uniform depth therein, so long as the speed is maintained. As the notches $f, g$ lead to the bottoms of said chambers, the oil will enter the same and be caught by the forwardly-moving faces thereof, and thrown inwardly toward the shaft on which the bushing is rotating, and toward the opposite side of the oil-chamber, or the middle of the bushing, thus forcing it into the space between the shaft and intermediate bearing-surface of the bushing, so as to lubricate the same, and at the same time, tending to prevent the oil from flowing in the opposite direction, or toward the ends of the bushing.

While the felt or wicking $e$ will, for a time, be effective in conducting the oil to the middle portion of the bushing, it is liable to become filled with solid substance, so that it becomes ineffective for this purpose, but, as the oil is constantly being supplied to the end of this portion of the bearing surface, as above described, constant lubrication thereof is assured.

In case oil should flow over the bearing surface between the notches $f$, $g$, toward the ends of the bushing, it will be intercepted by the grooves $j$, $k$, and, as the notches $f$, $g$ open into said grooves $j$, $k$, they will act as a drain therefor, when the bushing is at rest, and act as an exhausting-means therefor, when it is in motion, the oil being thrown by the surfaces of the notches toward the middle of the bushing, as already described.

It will be understood that only one set of the inclined faces, formed by said notches, is effective in causing the above-described circulating action on the oil, when the bushing is rotated in one direction, the other set being effective when it is rotated in the opposite direction, so that it is immaterial in which direction the bushing is caused to rotate.

I claim:—

1. A self-lubricating bushing having an annular oil-chamber leading from its bore adjacent each end, each chamber having a series of recesses in its outer side, extending obliquely from its bottom to the bearing-surface between the chamber and the end of the bushing.

2. A self-lubricating bushing having an annular oil-chamber leading from its bore, adjacent one end, and providing an end-bearing-face between said end and the chamber, the outer side wall of said chamber having a series of recesses therein, providing oil-deflecting surfaces extending divergently from said end-bearing-face to said chamber and obliquely to their path of rotation.

3. A self-lubricating bushing having an annular oil-chamber leading from its bore, adjacent one end, and providing an end-bearing-face between the same and the end of the bushing, the outer side wall of said chamber having a plurality of recesses therein, said recesses having their bottom portions extending divergently outward from said end-bearing-face to the bottom of the chamber, and oppositely-inclined sides to provide two series of oil-deflecting faces respectively operative according to the direction of rotation of the bushing.

4. A self-lubricating bushing having an annular oil-chamber leading from its bore, adjacent one end, and providing an end-bearing-face between the same and the end of the bushing, the outer side wall of said chamber having a plurality of adjacently-disposed V-shaped notches therein, the bottoms of which extend obliquely from intermediate points in said end-bearing-face to the bottom portion of the chamber.

5. A self-lubricating bushing having an annular oil-chamber leading from its bore, adjacent one end, and providing an end-bearing-face between the same and the end of the bushing, the outer side wall of said chamber having a plurality of V-shaped notches therein, the bottoms of which extend obliquely from intermediate points in said end-bearing-face to the bottom portion of the chamber, and said end-bearing-face having an annular oil-intercepting groove therein, into the inner side of which said notches lead.

6. A self-lubricating bushing having an annular oil-chamber leading from its bore, adjacent one end, and providing an end-bearing-face between each end and the adjacent chamber, the outer sides of each chamber having a plurality of adjacently-arranged notches, the sides of which extend divergently from the bottoms, and the bottoms of which extend obliquely from the bottom portion of the chamber to an intermediate portion of the adjacent end-bearing-face.

In testimony whereof, I have signed my name to this specification.

WILLIAM E. SHEEHY.

Witnesses:
L. H. HARRIMAN,
H. B. DAVIS.

Copies of this patent may be obtained for five cents each, by addressing the "Commissioner of Patents, Washington, D. C."